United States Patent
Yamakawa et al.

(10) Patent No.: US 10,259,294 B2
(45) Date of Patent: Apr. 16, 2019

(54) LAMINATED GLASS AND VEHICLE WINDOW

(71) Applicant: Asahi Glass Company, Limited, Chiyoda-ku (JP)

(72) Inventors: Hiroshi Yamakawa, Chiyoda-ku (JP); Toshimi Yajima, Chiyoda-ku (JP); Itsuro Watanabe, Chiyoda-ku (JP); Makoto Narita, Chiyoda-ku (JP); Satoshi Mori, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/640,779

(22) Filed: Jul. 3, 2017

(65) Prior Publication Data
US 2018/0009294 A1    Jan. 11, 2018

(30) Foreign Application Priority Data
Jul. 6, 2016 (JP) .................. 2016-134373

(51) Int. Cl.
*B60J 1/00* (2006.01)
*B60K 35/00* (2006.01)
(Continued)

(52) U.S. Cl.
CPC .................. *B60J 1/00* (2013.01); *B32B 1/04* (2013.01); *B32B 3/02* (2013.01); *B32B 3/14* (2013.01);
(Continued)

(58) Field of Classification Search
CPC .... B32B 1/00; B32B 1/04; B32B 3/00; B32B 3/02; B32B 3/06; B32B 3/08; B32B 3/10;
(Continued)

(56) References Cited

U.S. PATENT DOCUMENTS 3,282,772 A * 11/1966 Davis, Sr. ......... B32B 17/10036
156/102
3,427,770 A *  2/1969 Kunert .................. B29C 65/48
200/84 R
(Continued)

FOREIGN PATENT DOCUMENTS

DE       89 10 916 U1    10/1989
GB       1 221 285 A      2/1971
(Continued)

OTHER PUBLICATIONS

Hatakeyama (JP 2007-197288 A); Aug. 2007 (EPO machine translation to English) (Year: 2007).*

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

A laminated glass includes a first glass plate; a second glass plate with a plate thickness which is less than a plate thickness of the first glass plate; and an intermediate film. The first glass plate and the second glass plate are laminated via the intermediate film. An external dimension of the second glass plate is less than an external dimension of the first glass plate. At least a part of an outer peripheral edge of the second glass plate is located on an inner periphery side with respect to an outer peripheral edge of the first glass plate.

17 Claims, 5 Drawing Sheets

(51) Int. Cl.
*B32B 17/06* (2006.01)
*B32B 1/04* (2006.01)
*B32B 3/14* (2006.01)
*B32B 17/10* (2006.01)
*B32B 3/02* (2006.01)
*B32B 3/18* (2006.01)
*G02B 27/01* (2006.01)
*B60J 1/02* (2006.01)

(52) U.S. Cl.
CPC .............. *B32B 3/18* (2013.01); *B32B 17/06* (2013.01); *B32B 17/10036* (2013.01); *B32B 17/10091* (2013.01); *B32B 17/10137* (2013.01); *B32B 17/10293* (2013.01); *B32B 17/10348* (2013.01); *B32B 17/10633* (2013.01); *B32B 17/10651* (2013.01); *B32B 17/10761* (2013.01); *B60K 35/00* (2013.01); *B32B 2309/105* (2013.01); *B32B 2605/006* (2013.01); *B60J 1/02* (2013.01); *B60K 2350/921* (2013.01); *B60K 2350/94* (2013.01); *G02B 27/0101* (2013.01)

(58) Field of Classification Search
CPC .... B32B 3/14; B32B 3/18; B32B 7/00; B32B 7/04; B32B 7/045; B32B 7/14; B32B 17/06; B32B 17/10633; B32B 17/10348; B32B 17/10293; B32B 17/10137; B32B 17/10091; B32B 17/10036; B32B 17/10761; B32B 17/10651; B32B 2250/00; B32B 2250/02; B32B 2250/03; B32B 2309/105; B32B 2605/006; B60J 1/00; B60J 1/02; B60K 35/00; B60K 2350/921; B60K 2350/94; G02B 27/0101; Y10T 428/163; Y10T 428/168; Y10T 428/24628; Y10T 428/24752; Y10T 428/24777

USPC ........ 428/53, 54, 55, 56, 57, 58, 60, 61, 62, 428/77, 78, 79, 80
See application file for complete search history.

(56) References Cited

U.S. PATENT DOCUMENTS

| | | | |
|---|---|---|---|
| 3,558,415 A * | 1/1971 | Rieser et al. | B32B 17/10036 156/106 |
| 3,597,050 A * | 8/1971 | Plumat | B32B 17/10018 359/580 |
| 4,218,500 A * | 8/1980 | Radisch | B32B 17/10064 428/78 |
| 5,102,706 A * | 4/1992 | Latte | B44C 3/12 156/63 |
| 5,160,780 A | 11/1992 | Ono et al. | |
| 5,176,733 A * | 1/1993 | Koss | C03B 23/0258 65/107 |
| 5,464,693 A | 11/1995 | Ono et al. | |
| 5,716,694 A * | 2/1998 | Jacquemet | B32B 17/10036 428/192 |
| 5,914,178 A * | 6/1999 | Sol | B32B 17/10036 156/100 |
| 2012/0094084 A1* | 4/2012 | Fisher | B32B 17/10036 428/174 |
| 2012/0202030 A1* | 8/2012 | Kondo | B32B 17/06 428/215 |
| 2015/0224855 A1 | 8/2015 | Legrand | |

FOREIGN PATENT DOCUMENTS

JP 2007-197288 8/2007
JP 2007197288 A * 8/2007 ....... B32B 17/10036

* cited by examiner

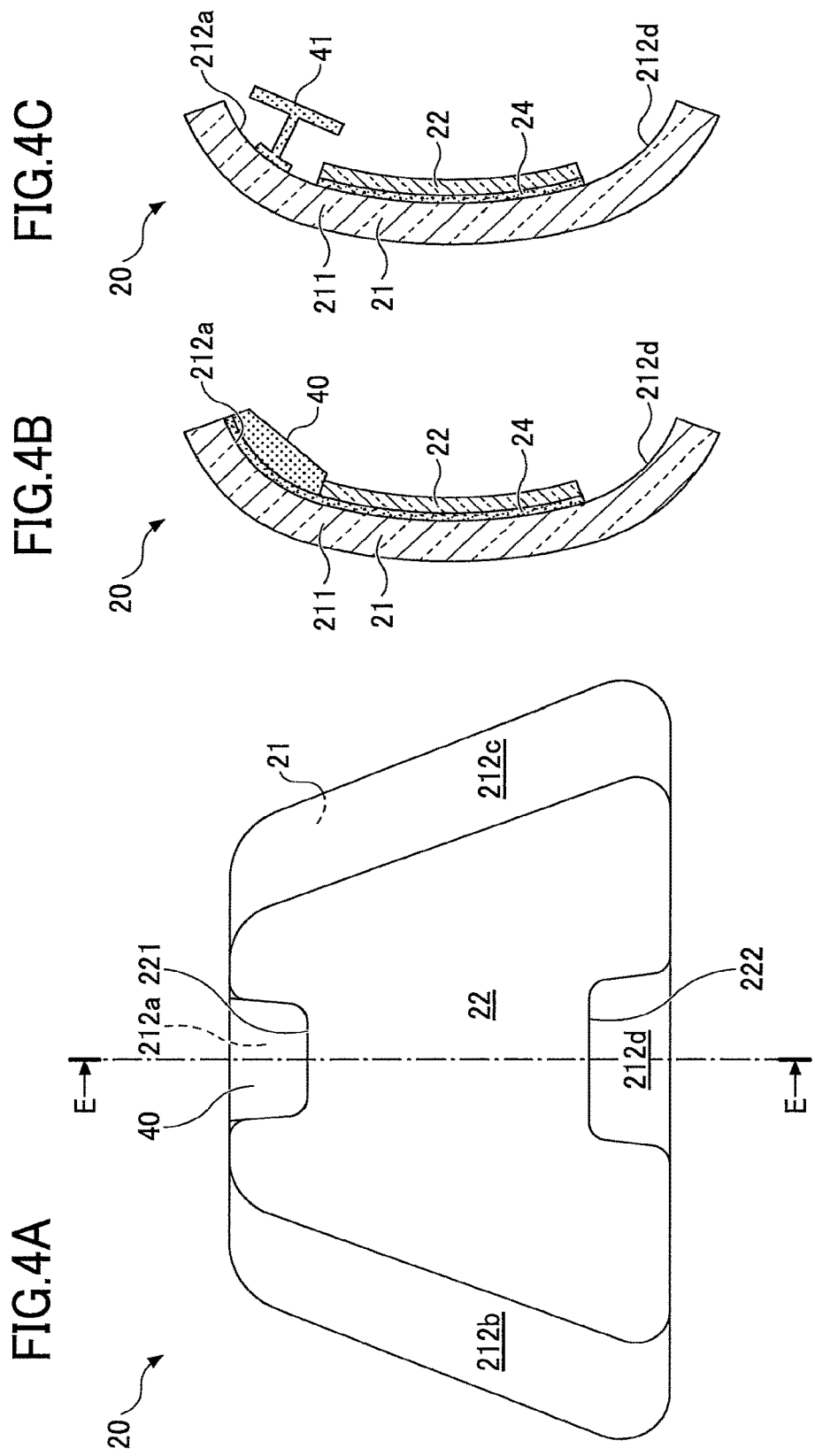

ns No. 2016-134373, filed Jul. 6, 2016. The contents of
LAMINATED GLASS AND VEHICLE WINDOW

CROSS-REFERENCE TO RELATED APPLICATION

The present application is based on and claims benefit of priority under 35 U.S.C. § 119 of Japanese Patent Applicatio the application are incorporated herein by reference in their entirety.

BACKGROUND OF THE INVENTION

1. Field of the Invention

The disclosure herein generally relates to a laminated glass and vehicle window.

2. Description of the Related Art

A laminated glass, in which two glass plates are laminated via an intermediate film, is provided with a resistance to penetration and a scattering prevention performance, and used for a window of building or a window of vehicle. Especially, a curved laminated glass is used for a vehicle, particularly a windshield, as a window that suppresses an aeromechanical resistance of the vehicle and a window having an aesthetic appearance.

In Recent years, weight saving of vehicles has been required against a background of increasing of fuel consumption of vehicles, proposal for hybrid vehicles or fuel cell vehicles, and the like. In the weight saving of a vehicle, in order to reduce weights of windows, there is a proposal for decreasing a plate thickness of a glass plate used for the laminated glass. Specifically, the proposal includes making the plate thickness of one of the glass plates configuring the laminated glass less than or equal to 1 mm. Furthermore, there is also a proposal for securing a prescribed strength by using a chemically strengthened glass for a glass plate having smaller plate thickness.

The laminated glass used for a vehicle window is typically curved. A curved laminated glass is generally manufactured as follows. Two uncurved glass plates are laminated and placed on a ring-shaped mold, and conveyed in a heating furnace, and thereby two curved glass plates with curvature radii that match with each other are prepared. In this case, because both glass plates are shaped without being rapidly cooled, the glass plates are not strengthened glass. When a chemically strengthened glass is used for the above-described glass plate having smaller plate thickness, the following trouble occurs. That is, when an uncurved chemically strengthened glass plate and another uncurved glass plate are laminated and placed on the ring-shaped mold, and conveyed in the heating furnace, a strengthening stress of the chemically strengthened glass is released by heating. As one considered approach in order to remove the above-described trouble, once the two curved glass plates are prepared, thereafter, one of the glass plates may be subjected to the chemically strengthened process. However, such management of a combination of the two glass plates shaped by the same ring-shaped mold is complicated and not practical.

Japanese Unexamined Patent Application Publication No. 2007-197288 discloses forcibly elastically deforming an uncurved glass plate having small plate thickness to follow a glass plate that has been curved and shaped in advance, and bonding by an intermediate layer or an adhesive layer lying between both glass plates.

SUMMARY OF THE INVENTION

It is a general object of at least one embodiment of the present invention to provide a laminated glass and a vehicle window that substantially obviate one or more problems caused by the limitations and disadvantages of the related art.

The laminated glass according to the disclosure of Japanese Unexamined Patent Application Publication No. 2007-197288 is referred to as single-curved bending, and is curved only in a single direction. When an uncurved glass plate is forcibly deformed elastically, performing the single-curved bending is relatively easy. However, forcibly deforming elastically an uncurved glass plate to follow a glass plate curved in two orthogonal directions, representatively, referred to as a plural-curved bending, is difficult. That is, when after making the uncurved glass plate follow a curve in one direction, the glass plate being made to follow a curve in another direction is attempted, a wrinkle occurs in an edge portion of the glass plate that is elastically deformed. The wrinkle indicates a deformation in the plate thickness direction occurring locally in the glass plate. From a viewpoint of controlling against a wrinkle, when the curve is gentle to the extent that the wrinkle does not become remarkable (a great curvature radius), the adhesive layer between both the glass plates can absorb mismatch of the degrees of curvature of both the glass plates. However, in the case of a great curve (small curvature radius), the adhesive layer cannot absorb sufficiently the mismatch of the degrees of curvature of both the glass plates. Then, either the glass plates may be delaminated or the thickness of the adhesive layer may be significantly different depending on a portion.

The present invention, in consideration of the above-described problem, aims at providing a light weight laminated glass in which such a wrinkle is reduced and a vehicle window thereby.

The present invention provides a laminated glass including a first glass plate; a second glass plate with a plate thickness which is less than a plate thickness of the first glass plate; and an intermediate film. The first glass plate and the second glass plate are laminated via the intermediate film. An external dimension of the second glass plate is less than an external dimension of the first glass plate. At least a part of an outer peripheral edge of the second glass plate is located on an inner periphery side with respect to an outer peripheral edge of the first glass plate.

According to the present invention, a light weight laminated glass in which wrinkle is reduced and a vehicle window can be provided.

BRIEF DESCRIPTION OF THE DRAWINGS

Other objects and further features of embodiments will become apparent from the following detailed description when read in conjunction with the accompanying drawings, in which:

FIGS. 4A to 4C are diagrams depicting an approximate front view (FIG. 4A), a sectional view cut along an E-E line (FIG. 4B) of a laminated glass according to a third embodiment, and a sectional view cut along the E-E line (FIG. 4C) of a laminated glass according to a variation of FIG. 4A.

DETAILED DESCRIPTION OF THE PREFERRED EMBODIMENTS

Figure 1:
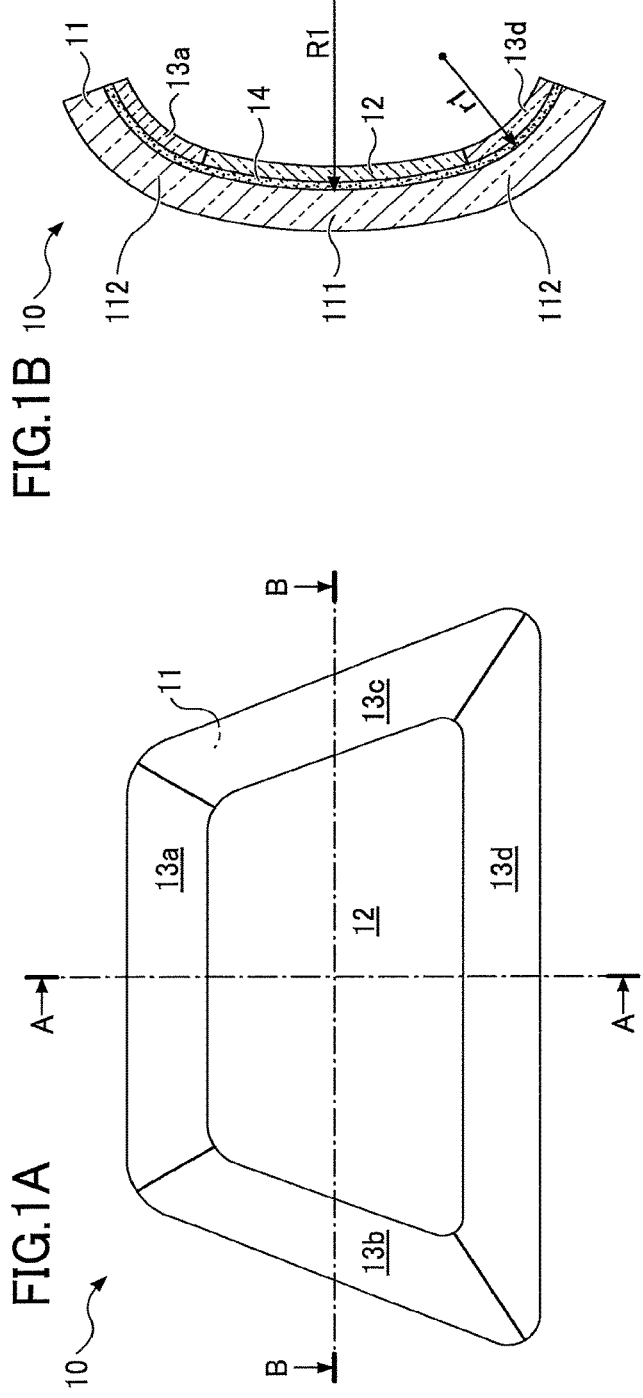
FIGS. 1A to 1C are diagrams depicting an approximate front view (FIG. 1A), an approximate sectional view cut along an A-A line (FIG. 1B), and a sectional view cut along a B-B line (FIG. 1C) of a laminated glass according to a first embodiment.

In the following, an embodiment of the present invention will be described with reference to the accompanying drawings. In the description, left and right, in a case not particularly indicated, are assumed to indicate a direction on the drawing that is referred. Moreover, in the present description, up and down, in a case not particularly indicated, are assumed to indicate a direction in a state of being assembled on a vehicle. A vertical direction and a horizontal direction are assumed to indicate directions in a state of being assembled on a vehicle. Moreover, a parallel direction is assumed to indicate not only a completely parallel direction, but also an approximately parallel direction.

Large versus small comparison of an external dimension required for understanding the present invention is comparison that can be clearly distinguished to the extent that it does not matter whether the comparison is made in a state before the glass plate is bent and formed or comparison is made after the glass plate is bent and formed. That is, even if it is a conventional laminated glass, in a state before bending and forming, an external dimension of a glass plate on a convex surface side of the laminated glass is somewhat greater than an external dimension of a glass plate on a concave surface side of the laminated glass. This is because when curvatures of both the glass plates match with each other after both the glass plates are bent and formed, a curvature radius of a concave surface of the glass plate on the convex surface side of the laminated glass is different from a curvature radius of a convex surface of the glass plate on the concave surface side of the laminated glass by a thickness of an intermediate film. Inversely, in the state after bending and forming, an external dimension of the glass plate on the convex surface side of the laminated glass in a projection view is almost coincident with an external dimension of the glass plate on the concave surface side of the laminated glass in a projection view. In the present invention, it is possible to distinguish clearly a difference of large versus small between a first glass plate and a second glass plate, as the conventional laminated glass described as above, to the extent that the large versus small comparison of the external dimension does not differ depending on whether the comparison is made in a state before the glass plate is bent and formed or the comparison is made after the glass plate is bent and formed. Typically, it is a difference so that, in the projection view, a value of [area of second glass plate]/[area of first glass plate] is 0.45 or more but 0.95 or less, especially 0.5 or more but 0.9 or less. The projection view indicates, in the specification, placing the laminated glass on a horizontal plane with the convex surface up, and projecting and viewing above from the vertical direction.

Moreover, a part of the first glass plate with a great curvature radius and a part with a small curvature radius, required for understanding the present invention, indicate the following. In one glass plate having a curved shape, except for the case where the glass plate has a spherical surface shape, the curvature radius is not uniform. In a vehicle window, typically, a curvature radius around a central line in the vertical direction of a glass plate is 10000 mm or more. A curvature radius around a central line in the horizontal direction is 5000 mm or more. A part having such curvature radii is a central region of the first glass plate in a front view, and can be referred to as a part having a great curvature radius in the first glass plate. Toward the periphery of the vehicle window, the curvature radius of the first glass plate decreases. For example, in FIG. 1C and FIG. 3C, which are cross sections orthogonal to the vertical direction, a curvature radius r2 around the left or right lateral side of the first glass plate is less than the curvature radius R2 around the center of the first glass plate. Moreover, in FIG. 1B and FIG. 3B that are cross sections orthogonal to the horizontal direction, a curvature radius r1 around the upper or lower edge of the first glass plate is less than the curvature radius R1 around the center of the first glass plate.

(First Embodiment)

FIGS. 1A to 1C are diagrams depicting an approximate front view (FIG. 1A), an approximate sectional view cut along an A-A line (FIG. 1B), and an approximate sectional view cut along a B-B line (FIG. 1C) of a laminated glass according to a first embodiment.

A laminated glass 10 is configured by laminating a first glass plate 11 and a second glass plate 12 via an intermediate film 14. A plate thickness of the second glass plate 12 is less than a plate thickness of the first glass plate 11. An external dimension of the second glass plate 12 is less than an external dimension of the first glass plate 11. An outer peripheral edge of the second glass plate 12 is located on an inner periphery side with respect to an outer peripheral edge of the first glass plate 11, over the whole periphery.

The first glass plate 11 and the second glass plate 12 have curved shapes. The first glass plate 11 has a central region 111 and an outer peripheral region 112 having a curved shape with a curvature radius less than that of the central region 111. In FIG. 1B, which is an approximate sectional view orthogonal to the horizontal direction, the curvature radius R1 of the central region 111 is greater than the curvature radius r1 of the outer peripheral region 112. Moreover, in FIG. 1C, which is an approximate sectional view orthogonal to the vertical direction, the curvature radius R2 of the central region 111 is greater than the curvature radius r2 of the outer peripheral region 112.

The second glass plate 12 is laminated on the central region 111 of the first glass plate 11, by laminating a convex surface of the second glass plate 12 on a concave surface of the first glass plate 11 via the intermediate film 14. According to the above-described configuration, a wrinkle in the peripheral region that easily occurs when the second glass plate 12 is forcibly deformed elastically to follow the first glass plate 11 can be reduced.

On the concave surface of the first glass plate 11 in the outer peripheral region 112, third glass plates 13a, 13b, 13c, and 13d are laminated via an intermediate film, so as to be adjacent to the second glass plate 12. Between an edge face of the second glass plate 12 and respective edge faces of the third glass plates 13a, 13b, 13c, and 13d, a sealing material such as a butyl rubber, a silicon resin or the like may be introduced. According to the above-described configuration, a water tightness between the edge face of the second glass plate 12 and the respective edge faces of the third glass plates 13a, 13b, 13c, and 13d can be enhanced.

In the laminated glass 10 configured in this way, an external shape of the first glass plate 11 has an approximately trapezoidal shape in a front view. The laminated glass 10 can be used for a vehicle window by arranging on a vehicle body so that an upper side is a shorter one of two sides of the approximately trapezoidal shape parallel to each other.

(Second Embodiment)

Figure 2:
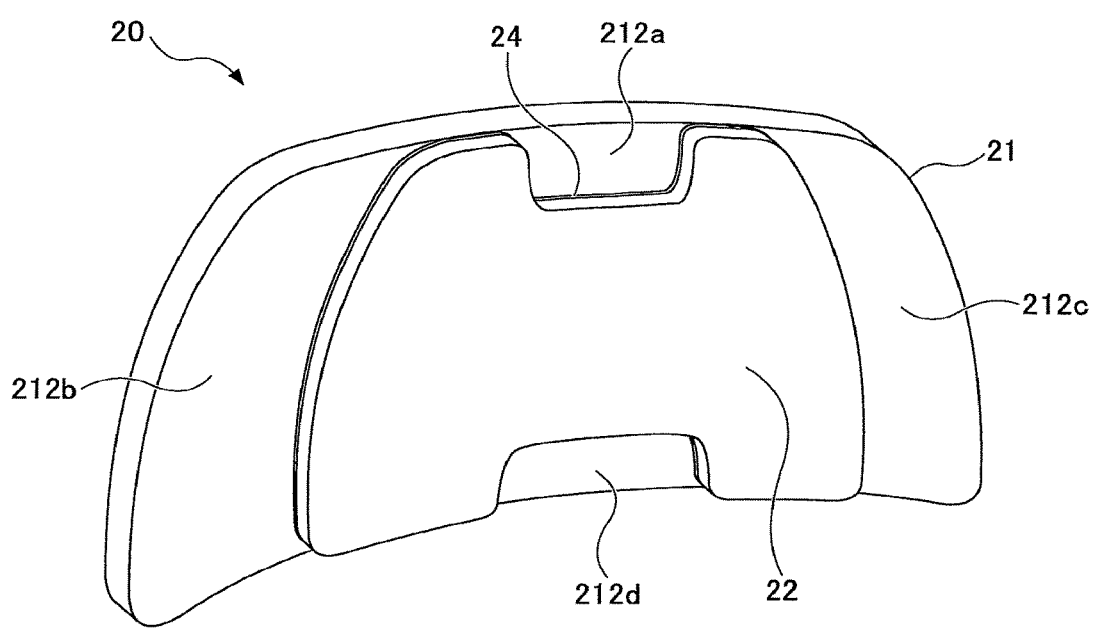
FIG. 2 is a diagram depicting an approximate perspective view of a laminated glass according to a second embodiment.
Figure 3B:
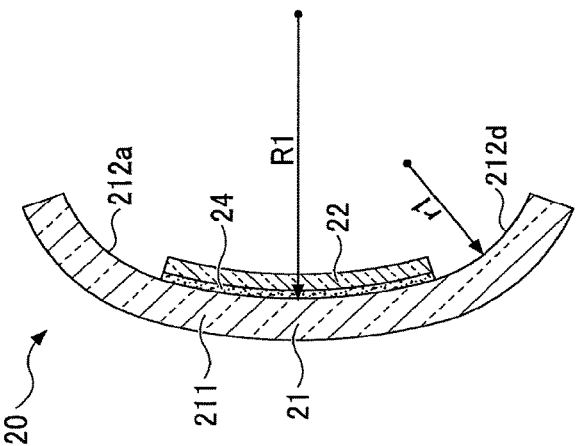
FIGS. 3A to 3C are diagrams depicting an approximate front view (FIG. 3A), a sectional view cut along a C-C line (FIG. 3B), and a sectional view cut along a D-D line (FIG. 3C) of a laminated glass illustrated in FIG. 2.
Figure 3A:
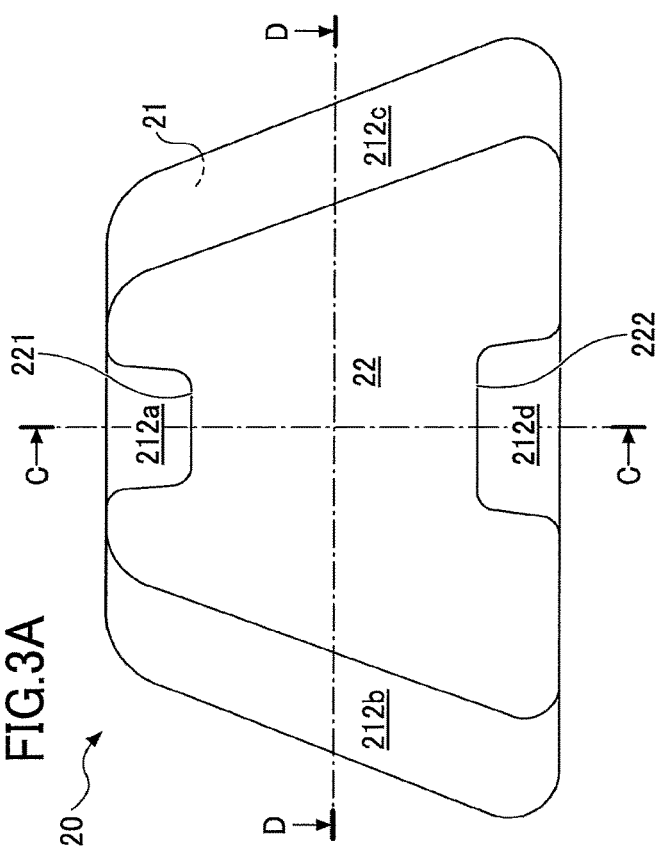
Figure 3C:
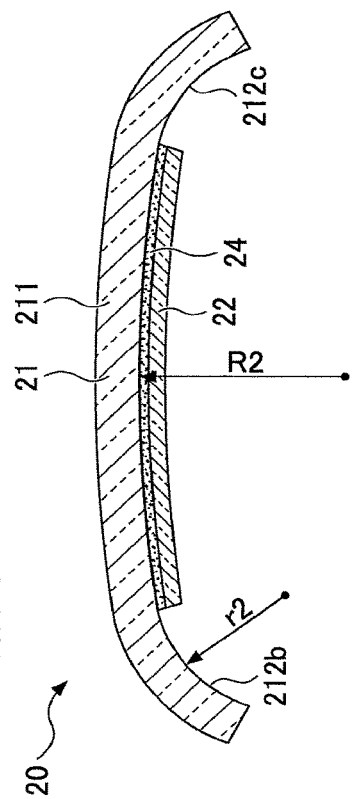

FIG. 2 is an approximate perspective view depicting a laminated glass according to a second embodiment of the present invention. FIGS. 3A to 3C are diagrams depicting an approximate front view (FIG. 3A), an approximate sectional view cut along a C-C line (FIG. 3B), and an approximate sectional view cut along a D-D line (FIG. 3C) of the laminated glass illustrated in FIG. 2.

A laminated glass 20 is configured by laminating a first glass plate 21 and a second glass plate 22 via an intermediate film 24. A plate thickness of the second glass plate 22 is less than a plate thickness of the first glass plate 21. An external dimension of the second glass plate 22 is less than an external dimension of the first glass plate 21. An outer peripheral edge of the second glass plate 22 is located on an inner periphery side with respect to an outer peripheral edge of the first glass plate 21 in a part of the whole periphery, and is almost coincident with the outer peripheral edge of the first glass plate 21 for the remaining part. The external shape of the first glass plate 21 has an approximately trapezoidal shape in a front view.

The first glass plate 21 and the second glass plate 22 have curved shapes. The first glass plate 21 has a central region 211 and an outer peripheral region 212 having a curved shape with a curvature radius less than that of the central region 211. In FIG. 3B, which is an approximate sectional view orthogonal to the horizontal direction, the curvature radius R1 of the central region 211 is greater than the curvature radius r1 of the outer peripheral regions 212a and 212d. Moreover, in FIG. 3C, which is an approximate sectional view orthogonal to the vertical direction, the curvature radius R2 of the central region 211 is greater than the curvature radius r2 of the outer peripheral regions 212b and 212c.

The second glass plate 22 is laminated on the central region 211 of the first glass plate 21, by laminating a convex surface of the second glass plate 22 on a concave surface of the first glass plate 21 via the intermediate film 24.

An external shape of the second glass plate 22 has an approximately trapezoidal shape. A shorter side of two sides of the approximately trapezoidal shape parallel to each other is an upper side, and a longer side is a lower side. On the upper side of the second glass plate 22 a notch portion 221 is provided. The notch portion 221 forms the outer peripheral region 212a of the first glass plate 21. In this way, a wrinkle in an upper side portion that easily occurs when the second glass plate 22 is forcibly deformed elastically to follow the first glass plate 21 can be reduced. Furthermore, by providing outer peripheral regions 212b and 212c on both side portions of the first glass plate 21, wrinkles in both side portions that easily occur when the second glass plate 22 is forcibly deformed elastically to follow the first glass plate 21 can be reduced.

In the embodiment, a notch portion 222 is also provided on the lower side of the second glass plate 22, and the notch portion 222 forms the outer peripheral region 212d of the first glass plate 21. In this way, providing notch portions on the upper and lower sides of the second glass plate 22 is preferable in a case where the curvature radius r1 around the vertical direction of the first glass plate 21 (curvature radius on the upper and lower sides) is smaller, especially when the curvature radius around the vertical direction in the central portion of the lower side is small.

In this way, because the second glass plate is laminated on the central region of the first glass plate with a small curvature radius, and the second glass plate is arranged so that a part of the outer peripheral edge of the second glass plate is almost coincident with the outer peripheral edge of the first glass plate, i.e. the upper side and the lower side of the second glass plate are approximately along the upper side and the lower side of the first glass plate, respectively, the following effect is obtained. That is, when the laminated glass is used for a vehicle window, especially a windshield or a backlight, the laminated glass is connected to a vehicle body via an adhesive agent. The adhesive agent is provided on a concave surface peripheral portion of the laminated glass. At this time, in the concave surface peripheral portion of the laminated glass according to the embodiment, the first glass plate and the second glass plate are present alongside. Because the vehicle body warps during travelling, especially travelling in a curve, the laminated glass also deforms. Taking into account of this deformation occurring often, when the first glass plate and the second glass plate deform separately, degradation in a bond between the first glass plate and the second glass plate will readily occur. In order to prevent such successive degradation in a bond from occurring, a peripheral portion of the second glass plate and a peripheral portion of the outer peripheral region of the first glass plate are preferably connected to the vehicle body via the adhesive agent so that the first glass plate and the second glass plate can deform integrally with each other. In a part of the concave surface peripheral portion where the adhesive agent is provided, a dark color layer is preferably arranged, so as to be shielded from the outside of the vehicle for preventing the adhesive agent from degrading or the like. In this case, a dark color layer can be arranged in either both of a peripheral portion of the second glass plate and a peripheral portion of the outer peripheral region of the first glass plate, or along a whole perimeter of the concave surface peripheral portion of the first glass plate. In order to form the dark color layer from a fired body of a ceramic paste, the dark color layer is preferably arranged in the whole circumference of the concave surface peripheral portion of the first glass plate. Moreover, an entire or a part of the outer peripheral region of the first glass plate can be physically strengthened, to form a partially strengthened glass.

(Third Embodiment)

FIGS. 4A to 4C are diagrams depicting an approximate front view (FIG. 4A), an approximate sectional view cut along an E-E line (FIG. 4B) of an example of the laminated glass according to the second embodiment used for a windshield of a vehicle, and an approximate sectional view cut along the E-E line (FIG. 4C) of another example of the laminated glass according to the second embodiment used for the windshield of the vehicle. In FIGS. 4A to 4C, the same reference numerals as in FIGS. 2 to 3C are assigned to the same members as in the laminated glass according to the second embodiment.

In an upper side central portion of the first glass plate 21, an upper side outer peripheral region 212a is arranged. The upper side outer peripheral region 212a is at least a part of the outer peripheral region 212 that has a smaller curvature radius than the central region 211. In the upper side outer peripheral region 212a, a back monitor 40 that is a display member for displaying information behind the vehicle is laminated. The back monitor 40 displays information obtained from a camera arranged in a rear part of the vehicle. The back monitor 40 may be a liquid crystal display device or an organic EL display device. Moreover, such a display device may be a transparent display device. The back monitor 40 may be arranged so as to cover an almost entire surface of the upper side outer peripheral region 212a for the whole device, arranged in a part of the upper side outer peripheral region 212a, or arranged so as to cover also a part of the second glass plate 22 beyond the upper side outer peripheral region 212a.

Moreover, in at least a part of right and left lateral side portions of the first glass plate 21, lateral side outer peripheral regions 212b, 212c are arranged. The lateral side outer peripheral regions 212b, 212c are at least parts of the outer peripheral region 212. As a variation of the third embodiment, on the lateral side outer peripheral regions 212b, 212c, various display devices (display members) that can display information around the vehicle, especially also information on both sides of the vehicle on behalf of sideview mirrors, may be laminated. Furthermore, in an outer peripheral region 212d arranged in a lower side central portion of the first glass plate 21 (in the following, referred to as a lower side outer peripheral region 212d), a head-up display that is a display member for displaying travelling information of the vehicle or the like may be laminated. In these cases, any one of, or combination of some of, or all of (1) an example of arranging a back monitor in the upper side outer peripheral region 212a, (2) an example of arranging various display devices on the lateral side outer peripheral regions 212b, 212c, and (3) an example of arranging the head-up display in the lower side outer peripheral region, may be employed.

Moreover, as the display member, a room mirror 41 may be provided instead of the back monitor 40 (See FIG. 4C). In this case, it is possible to obtain the same structure as a conventional room mirror arranged on a concave surface of the laminated glass via a mirror base. Especially, because the mirror base can be connected to the first glass plate with a great plate thickness, great connection strength can be maintained.

Furthermore, as a variation of the above-described example, a back monitor can be connected to a third glass plate 13a in the laminated glass according to the first embodiment, illustrated in FIG. 1. That is, in the upper side outer peripheral region of the first glass plate 11, the backup monitor 40 may be laminated via the third glass plate 13a.

Moreover, various display devices may be connected to third glass plates 13b, 13c. That is, in the lateral side outer peripheral region of the first glass plate 11, various display devices may be laminated via the third glass plates 13b, 13c. Furthermore, in the lower side outer peripheral region of the first glass plate 11, a head-up display can be connected to a third glass plate 13d. That is, in the lower side outer peripheral region of the first glass plate 11, the head-up display may be laminated via the third glass plate 13d.

The plate thickness of the first glass plate is preferably 1.5 mm or more but 4.0 mm or less. The plate thickness of the second glass plate is preferably 0.2 mm or more but 1.0 mm or less.

The plate thickness of the first glass plate is more preferably 1.8 mm or more but 3.5 mm or less, and further preferably 2.0 mm or more but 3.0 mm or less.

Moreover, the plate thickness of the second glass plate is more preferably 0.2 mm or more but 0.9 mm or less, and further preferably 0.3 mm or more but 0.8 mm or less.

A ratio between the plate thickness of the first glass plate 11 and the plate thickness of the second glass plate 12 is preferably 0.1 or more but 0.5 or less, and more preferably 0.15 or more but 0.4 or less.

In this way, by making the plate thickness of the first glass plate 201 greater than the plate thickness of the second glass plate, a rigidity required for a vehicle window can be secured by the first glass plate, and weight of the vehicle can be reduced by reducing the plate thickness of the second glass plate. The first glass plate preferably has a greater rigidity than the second glass plate according to the plate thickness, the composition, or the like.

The second glass plate is preferably a chemically strengthened glass plate. That is, the second glass plate is configured by appropriately selecting ion exchangeable glass, such as a soda-lime glass, an aluminosilicate glass, or the like.

An example of a glass composition used for the above-described glass plate includes, in a composition displayed in mol % based on the oxide, 50-80% of $SiO_2$, 0-10% of $B_2O_3$, 0.1-25% of $Al_2O_3$, 3-30% of $Li_2O+Na_2O+K_2O$, 0-25% of MgO, 0-25% of CaO, 0-5% of SrO, 0-5% of BaO, 0-5% of $ZrO_2$, and 0-5% of $SnO_2$, but it is not particularly limited to this. More specifically, the following glass compositions are included. Note that, for example, "including 0-25% of Mg" means that Mg is not indispensable but may be included up to 25%.

(i) a glass including, in a composition displayed in mol %, 63-73% of $SiO_2$, 0.1-5.2% of $Al_2O_3$, 10-16% of $Na_2O$, 0-1.5% of $K_2O$, 5-13% of MgO, and 4-10% of CaO.

(ii) a glass including, in a composition displayed in mol %, 50-74% of $SiO_2$, 1-10% of $Al_2O_3$, 6-14% of $Na_2O$, 3-11% of $K_2O$, 2-15% of MgO, 0-6% of CaO, and 0-5% of $ZrO_2$. A sum of contents of $SiO_2$ and $Al_2O_3$ is 75% or less, a sum of contents of $Na_2O$ and $K_2O$ is 12-25%, and a sum of contents of MgO and CaO is 7-15%.

(iii) a glass including, in a composition displayed in mol %, 68-80% of $SiO_2$, 4-10% of $Al_2O_3$, 5-15% of $Na_2O$, 0-1% of $K_2O$, 4-15% of MgO, and 0-1% of $ZrO_2$.

(iv) a glass including, in a composition displayed in mol %, 67-75% of $SiO_2$, 0-4% of $Al_2O_3$, 7-15% of $Na_2O$, 1-9% of $K_2O$, 6-14% of MgO, and 0-1.5% of $ZrO_2$. A sum of contents of $SiO_2$ and $Al_2O_3$ is 71-75%, and a sum of contents of $Na_2O$ and $K_2O$ is 12-20%. When including CaO, a content of CaO is less than 1%.

(v) a glass including, in a composition displayed in mol %, 60-70% of $SiO_2$, 0-10% of $B_2O_3$, 8-15% of $Al_2O_3$, 10-17% of $Na_2O$, 0-3% of $K_2O$, 0-10% of MgO, 0-1% of CaO, and 0-1% of $ZrO_2$. A sum of contents of $SiO_2$ and $Al_2O_3$ is 76-81% and a sum of contents of $Na_2O$ and $K_2O$ is 13-16%.

Moreover, the second glass plate is preferably transparent. Thus, a low wavelength region of near infrared light is not absorbed in the second glass plate. Therefore, in an example of manufacturing a laminated glass, which will be described later, the intermediate film can be sufficiently heated. In the specification, the term "transparent" indicates that a transmission quantity of visible light is 80% or more. Moreover, because the second glass plate is transparent, a unique texture such that the second glass plate coats the first glass plate is obtained, and a laminated glass excellent in design nature can be obtained.

A glass used for the first glass plate is not particularly limited, but a glass including, in a composition displayed in weight %, 65-75% of $SiO_2$, 0.1-5% of $Al_2O_3$, 5-10% of CaO, 2-5% of MgO, 10-15% of $Na_2O$, 0-3% of $K_2O$ and 0.2-3% of $Fe_2O_3$ is especially preferable, because the low wavelength region of near infrared light can be absorbed.

Moreover, for both the first glass plate and the second glass plate a functional thin film may be provided on the concave surface and/or the convex surface of each of the first and second glass plates. The functional thin film includes, for example, an infrared light reflection film, a water repellent film, or an antifogging film.

The material of the intermediate film may be a material generally used for a conventional laminated glass for vehicle. For example, polyvinyl butyral (PVD), ethylene vinyl acetate (EVA) copolymer or the like may be used. Moreover, a thermosetting resin that is in a liquid form before heating may be used. That is, the intermediate film only has to be in a form of film when it is in a state of a laminated glass, and the intermediate film may be in a liquid farm when it is in a state before connecting glass plates.

Moreover, the intermediate film with a thickness of, for example, 0.5 mm or more but 4 mm or less, especially 2 mm or less, is preferably used. It is possible to exemplify an external dimension of the intermediate film as the external dimension with approximately the same shape of the second glass plate. Therefore, depending on a member connected to an outer peripheral region of the first glass plate on which the second glass plate is not laminated, an adhesive layer other than the intermediate film may be provided on the outer peripheral region of the first glass plate. When the third glass plate is laminated on the first glass plate adjacent to the second glass plate, the external dimension of the intermediate film can be fitted to the external dimension of the first glass plate.

An intermediate film in which an infrared light shielding agent is contained may be used. A material of the infrared light shielding agent includes, for example, fine particles including a metal, an oxide, a nitride, or a sulfate of Sn, Sb, Ti, Si, Zn, Zr, Fe, Al, Cr, Co, Ce, Cs, In, Ni, Ag, Cu, Pt, Mn, Ta, W, V, Mo, or a doped material, in which Sb or F is doped. These fine particles may be used singularly or by combination. Moreover, a mixture in which these single materials or composite materials are mixed into an organic resin may be used. Moreover, a coated material in which these single materials or composite materials are coated with an organic resin may be used. Moreover, as the infrared light shielding agent, a coloring agent, dye, an organic material (phthalocyanine, naphthalocyanine or the like) or the like may be used.

Moreover, the intermediate film may have a cross section for the head up display having a shape of wedge. Moreover, the intermediate film may have a multi-layered structure in which a plurality of intermediate films having different viscoelasticity in the thickness direction or the like are laminated.

In the above-described example, an application of the laminated glass according to the present invention to a front windshield of a vehicle, or to a backlight has been exemplified. However, the laminated glass according to the present invention can be used for any of windows of the vehicle, such as a vehicle side window that slides vertically or a roof window. It is preferable that the laminated glass according to the present invention is used for a windshield or a backlight that contributes to weight saving, ensures stiffness, and has a small curvature radius. Especially, it is preferable to use the laminated glass according to the present invention for the windshield because a display device for displaying various pieces of information for a passenger becomes easy to be installed.

In this way, when the laminated glass according to the present invention is used for a vehicle window, the laminated glass has a curved shape. In this case, the central region of the first glass plate has a greater curvature radius than a curvature radius of the outer peripheral region. This is because the outer peripheral region is generally bent so as to fit a shape of the vehicle. The curvature radius of the central region at this time is, as described above, typically, as follows: the curvature radius R2 around the central line in the vertical direction of the glass plate is 10000 mm or more, and a curvature radius R1 around the central line in the horizontal direction is 5000 mm or more. Because when the second glass plate is laminated on the first glass plate having the above-described shape, occurrence of a wrinkle is reduced, both the curvature radius R2 around the central line in the vertical direction of the first glass plate and the curvature radius R1 around the central line in the horizontal direction are preferably 10000 mm or more. Moreover, even if one curvature radius is small, when another curvature radius is great, an occurrence of a wrinkle is reduced. In this case, the curvature radius R2 around the central line in the vertical direction is preferably 15000 mm or more, and the curvature radius R1 around the central line in the horizontal direction is preferably 5000 mm or more. Upper limits of these curvature radii are not particularly limited, but taking into account the shape of the vehicle, the upper limits are generally 20000 mm or less.

The outer peripheral region of the first glass plate has a smaller curvature radius compared with the central region. Therefore, difference between an actual area (i.e. surface area in 3 dimensions) and an area in a projection view for the outer peripheral region is greater than difference between an actual area of the central region and an area in a projection view for the central region. Therefore, in the case of using the laminated glass according to the present invention for a vehicle window, when a value of [area of outer peripheral region]/[area of central region] of the actual area is 0.1 or more but 0.5 or less and a value of [area of outer peripheral region]/[area of central region] of the area in the projection view is 0.05 or more but 0.3 or less, a vehicle window that can be preferably attached to a vehicle body that has a shape finished with a curved surface by which an aeromechanical resistance is reduced can be provided. Such a laminated glass can be simply said to be a greatly curved laminated glass. Because such a laminated glass includes a problem of occurrence of a wrinkle, it is favorable that the first glass plate has the value of [area of outer peripheral region]/[area of central region] of the actual area of 0.1 or more but 0.5 or less and the value of [area of outer peripheral region]/[area of central region] of the area in the projection view of 0.05 or more but 0.3 or less. Moreover, because the second glass plate is laminated in the central region that is not as curved as the outer peripheral region, it is favorable that a value of [area of second glass plate]/[area of first glass plate] is 0.45 or more but 0.95 or less, especially 0.5 or more but 0.9 or less.

(Example of Manufacturing of Laminated Glass)

Figure 5:
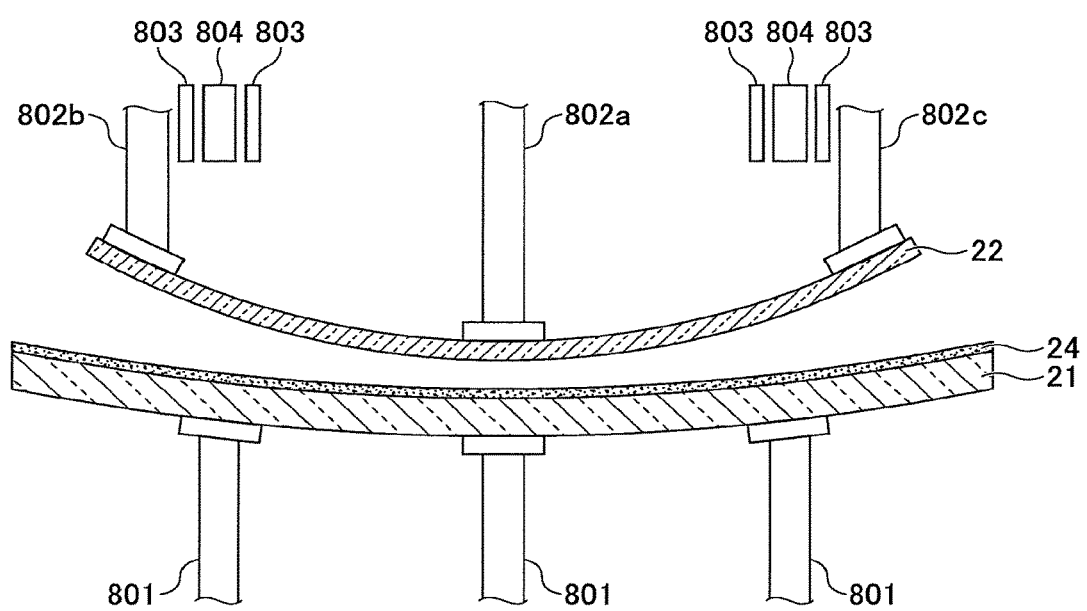
FIG. 5 is a diagram for explaining a manufacturing method for a laminated glass according to the second embodiment.

A manufacturing method for a laminated glass includes various methods. In the following, an example of the manufacturing method for a laminated glass according to the second embodiment will be described with reference to FIG. 5.

A first absorptive pad 801 supports the first glass plate 21 that is bent and formed. A second absorptive pad 802 is coupled to a lifting driving unit (not shown), and depresses the second glass plate 22 so that the surface of the second glass plate 22 becomes in contact with the surface of the first glass plate 21 via the intermediate film 24.

A welding head 804 is provided with pressing units 803 around it and is coupled to the lifting driving unit (not shown). In the same way as the second absorptive pad 802, the welding head 804 depresses the second glass plate 22 so that the surface of the second glass plate 22 becomes in contact with the surface of the first glass plate 21 via the intermediate film 24, and irradiates the intermediate film 24 with near infrared rays in a long wavelength region to heat the intermediate film 24, and thereby joining the first glass plate 21, the second glass plate 22, and the intermediate film 24. Because the first glass plate 21, the second glass plate 22, and the intermediate film 24 are joined stably, a wrinkle does not readily occur when a laminated glass 20 is formed.

A light source that emits near infrared rays in the long wavelength region includes, for example, a halogen heater, a halogen lamp, an infrared lamp for drying, a light emitting diode that emits light in the near infrared ray region, a semiconductor laser, a Nd-YAG laser, a dye laser, or a Ti-doped sapphire laser. The long wavelength region of the near infrared rays indicates a range of wavelength of 700 nm or more but 1500 nm or less, for example. The light source only has to emit light including near infrared rays in the low wavelength region, and may also emit light of the other wavelength.

First, the first glass plate 21 is placed on a forming die having a shape of a ring (not shown), and conveyed in a heating furnace (not shown), and thereby the first glass plate 21 is bent and formed. Afterwards, the first glass plate 21 is placed on the first absorptive pad 801, and the intermediate film 24 that is cut in an appropriate shape is positioned and placed on the first glass plate 21.

The second glass plate 22 that is not bent and formed (or preliminarily bent and formed to some extent) is positioned at a predetermined location. A central portion and outer peripheral portions of the second glass plate 22 are absorbed and retained by an absorptive pad 802a and absorptive pads 802b, 802c, respectively, and the absorptive pad 802a is projected toward the first glass plate 21. Subsequently, the absorptive pads 802b, 802c are projected in the same way as the absorptive pad 802a.

In this way, the first glass plate 21 and the second glass plate 22 are pressed by using the first absorptive pad 801 and the second absorptive pad 802 so that the surface of the first glass plate 21, the intermediate film 24 and the surface of the second glass plate 22 adhere to each other in order from the central portion to the outer peripheral portion. Afterwards, the first glass plate 21, the intermediate film 24, and the second glass plate 22 around a region which is irradiated with near infrared rays emitted from the welding head 804 are further depressed by the pressing units 803, and the region is irradiated with near infrared rays from the welding head 804, and thereby the region is welded. Because the first glass plate 21, the second glass plate 22 and the intermediate film 24 are coupled stably, a wrinkle does not readily occur when a laminated glass 20 is formed.

Afterwards, the welded part is rapidly cooled by a cooling apparatus (not shown), and a laminated glass in which glass plates are temporarily bonded by welding at a few points is obtained.

The temperature of the intermediate film 24 upon welding is preferably 90° C. or more but 150° C. or less. The irradiation time of near infrared rays is preferably 10 seconds or less, more preferably 7 seconds or less, and further preferably 5 seconds or less. Moreover, the cooling time is 20 seconds or less, preferably 15 seconds or less, and further preferably 10 seconds or less. Because the first glass plate 21, the second glass plate 22 and the intermediate film 24 are stably coupled to each other, upon forming the laminated glass 20, a wrinkle does not readily occur.

Moreover, by controlling a condition such as a rate of rapid cooling, a change ratio of the rate of rapid cooling, or a temperature before the rapid cooling, the glass plates and the intermediate film are bonded more stably at a position of temporary bonding and around the position, and it is possible to make the occurrence of a wrinkle more difficult.

Next, a temporarily bonded laminated glass, obtained as above, is placed into a bag body. A pressure is reduced by ejecting an air from inside the bag body using a vacuum pump, and thereby the bag body and the temporarily bonded laminated glass for vehicle are caused to adhere to each other. By ejecting the air, in this state, the inside of the bag body is squeezed by the atmospheric pressure, and the first glass plate 21, the intermediate film 24 and the second glass plate 22 adhere to each other in a state where the atmospheric pressure is applied. In this state, the temporarily bonded laminated glass is heated by a heating apparatus, and preliminarily press-bonded.

Moreover, as another method of the preliminary press-bonding, the laminated glass may be caused to pass through a pair of pressurizing rollers while being heated. A distance between the rollers is less than a thickness of the temporarily bonded laminated glass plates for vehicle. Therefore, when the temporarily bonded laminated glass plates for vehicle passes through the pressurizing rollers, the first glass plate 21 and the second glass plate 22 are pressed to each other. Then, air existing inside the temporarily bonded laminated glass plates is forced outwards, and thereby the preliminary press-bonded glass is obtained.

Afterwards, the preliminary press-bonded laminated glass is finally press-bonded by an autoclave, and thereby a laminated glass 20 is obtained.

According to the present invention, a curved laminated glass, in which two or more glass plates with different plate thicknesses are used, with an external dimension of a glass plate with a smaller plate thickness being made smaller than an external dimension of a glass plate with a greater plate thickness, and thereby reducing an occurrence of a wrinkle, can be provided. Especially, the laminated glass according to the present invention contributes to reduction of vehicle weight and secures rigidity, and can be preferably used for a windshield having a small curvature radius and a backlight.

What is claimed is:

1. A laminated glass comprising:
   a first glass plate;
   a second glass plate with a plate thickness which is less than a plate thickness of the first glass plate; and
   an intermediate film, the first glass plate and the second glass plate being laminated via the intermediate film,
   wherein an external dimension of the second glass plate is less than an external dimension of the first glass plate, and
   at least a part of an outer peripheral edge of the second glass plate is located on an inner periphery side with respect to an outer peripheral edge of the first glass plate,
   the first glass plate and the second glass plate have curved shapes,
   the first glass plate includes a central region and an outer peripheral region having a curved shape with a smaller curvature radius than the central region,
   a convex surface of the second glass plate is laminated on a concave surface of the first glass plate, in at least a part of the central region, via the intermediate film,
   a value of an actual area of the outer peripheral region divided by an actual area of the central region is 0.1 or more but 0.5 or less, and
   a value of an area of the outer peripheral region in a projection view divided by an area of the central region in the projection view is 0.05 or more but 0.3 or less.

2. The laminated glass according to claim 1,
   wherein a part of the outer peripheral edge of the second glass plate is flush with the outer peripheral edge of the first glass plate.

3. The laminated glass according to claim 1,
wherein the plate thickness of the first glass plate is 1.5 mm or more but 4.0 mm or less, and the plate thickness of the second glass plate is 0.2 mm or more but 1.0 mm or less.

4. The laminated glass according to claim 1,
wherein a ratio between the plate thickness of the second glass plate and the plate thickness of the first glass plate is 0.1 or more but 0.5 or less.

5. The laminated glass according to claim 1,
wherein the second glass plate is a chemically strengthened glass plate.

6. The laminated glass according to claim 1,
wherein a value of an actual area of the second glass plate divided by an actual area of the first glass plate is 0.45 or more but 0.95 or less.

7. The laminated glass according to claim 1, further comprising:
a third glass plate laminated on the concave surface of the first glass plate in the outer peripheral region via the intermediate film so as to be adjacent to the second glass plate.

8. The laminated glass according to claim 7,
wherein a sealing material is arranged between the second glass plate and the third glass plate.

9. A vehicle window comprising the laminated glass according to claim 7,
wherein an external shape of the first glass plate has an approximately trapezoidal shape,
an upper side is a shorter one of two sides of the approximately trapezoidal shape parallel to each other,
a central part of the upper side is an upper side outer peripheral region that is at least a part of the outer peripheral region, and
a first display member is laminated on the upper side outer peripheral region via the third glass plate.

10. A vehicle window comprising the laminated glass according to claim 7,
wherein an external shape of the first glass plate has an approximately trapezoidal shape,
an upper side is a shorter one of two sides of the approximately trapezoidal shape parallel to each other,
at least a part of a lateral side of the approximately trapezoidal shape is a lateral side outer peripheral region that is at least a part of the outer peripheral region, and
a second display member is laminated on the lateral side outer peripheral region via the third glass plate.

11. A vehicle window comprising the laminated glass according to claim 1,
wherein an external shape of the first glass plate has an approximately trapezoidal shape, and
an upper side is a shorter one of two sides of the approximately trapezoidal shape parallel to each other.

12. A vehicle window comprising the laminated glass according to claim 1,
wherein an external shape of the first glass plate has an approximately trapezoidal shape,
an upper side is a shorter one of two sides of the approximately trapezoidal shape parallel to each other,
a central part of the upper side comprises an upper side outer peripheral region that is at least a part of the outer peripheral region, and
a first display member is laminated on the upper side outer peripheral region.

13. The vehicle window according to claim 12,
wherein an external shape of the second glass plate has an approximately trapezoidal shape,
an upper side is a shorter one of two sides of the approximately trapezoidal shape parallel to each other, and a lower side is a longer one of the two sides,
the upper side and the lower side of the second glass plate are arranged approximately along the upper side and a lower side of the first glass plate, respectively, and
the outer peripheral region of the first glass plate comprises a notch portion in at least one of a central portion of the upper side of the second glass plate and a central portion of the lower side of the second glass plate.

14. A vehicle window comprising the laminated glass according to claim 1,
wherein an external shape of the first glass plate has an approximately trapezoidal shape,
an upper side is a shorter one of two sides of the approximately trapezoidal shape parallel to each other,
at least a part of a lateral side of the approximately trapezoidal shape is a lateral side outer peripheral region that is at least a part of the outer peripheral region, and
a second display member is laminated on the lateral side outer peripheral region.

15. The laminated glass of claim 1, wherein a curvature radius R2 around a central line in a vertical direction of the first glass plate is 10000 mm or more, and a curvature radius R1 around a central line in a horizontal direction is 5000 mm or more.

16. The laminated glass of claim 1, wherein both a curvature radius R2 around a central line in a vertical direction of the first glass plate and a curvature radius R1 around a central line in a horizontal direction are 10000 mm or more.

17. The laminated glass of claim 1, wherein a curvature radius R2 around a central line in a vertical direction of the first glass plate is 15000 mm or more, and a curvature radius R1 around a central line in a horizontal direction is 5000 mm or more.

* * * * *